United States Patent
Yasukawa et al.

(10) Patent No.: US 10,769,767 B2
(45) Date of Patent: Sep. 8, 2020

(54) MONITORING SYSTEM AND ITS CONTROL METHOD

(71) Applicant: Hitachi, Ltd., Tokyo (JP)

(72) Inventors: Kazuki Yasukawa, Tokyo (JP); Nobuyuki Shimizu, Tokyo (JP); Kousuke Shibata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/281,377

(22) Filed: Feb. 21, 2019

(65) Prior Publication Data

US 2019/0385294 A1 Dec. 19, 2019

(30) Foreign Application Priority Data

Jun. 18, 2018 (JP) .................. 2018-115539

(51) Int. Cl.
*G06T 7/00* (2017.01)
(52) U.S. Cl.
CPC .................. *G06T 7/0002* (2013.01)
(58) Field of Classification Search
None
See application file for complete search history.

(56) References Cited

U.S. PATENT DOCUMENTS

2012/0086804 A1* 4/2012 Ishibashi .................. H02J 7/35
348/143

FOREIGN PATENT DOCUMENTS

| JP | 7-65152 A | | 3/1995 |
|---|---|---|---|
| JP | H7-65152 A | * | 3/1995 |
| JP | 2002-056387 A | | 2/2002 |
| JP | 2003-242587 A | | 8/2003 |
| JP | 2003242587 A | * | 8/2003 |

OTHER PUBLICATIONS

Japanese Office Action received in corresponding Japanese Application No. 2018-115539 dated Feb. 12, 2020.

* cited by examiner

*Primary Examiner* — William C Vaughn, Jr.
*Assistant Examiner* — Joseph Daniel A Towe
(74) *Attorney, Agent, or Firm* — Mattingly & Malur, PC

(57) ABSTRACT

A monitoring system monitors a monitoring object apparatus sufficiently for practical use while suppressing battery power consumption. The monitoring system is provided a sensor terminal that is driven by a battery and acquires a measured value(s) of a measuring apparatus mounted in the monitoring object apparatus by executing image analysis processing on a captured image(s) obtained by photographing the measuring apparatus. A manager terminal monitors the measured value(s) of the measuring apparatus which is reported from the sensor terminal. When the measured value is out of a normal range, the manager terminal requests transmission of image data of an image area, which is necessary to check whether the measured value of the measuring apparatus is actually out of the normal range or not. The sensor terminal transmits the requested image data with the requested resolution to the manger terminal in response to the request from the manager terminal.

10 Claims, 11 Drawing Sheets

FIG.4

SENSOR VALUE STORAGE TABLE 50

| MEASUREMENT DATE AND TIME | SENSOR VALUE |
|---|---|
| 2018/1/1  10:30:30 | 3600 |
| ... | ... |

THRESHOLD VALUE DETERMINATION CONDITION TABLE 51

| CONDITION ITEM | VALUE |
|---|---|
| NUMBER OF DAYS OF PAST DATA | 30 |
| WIDTH (STANDARD DEVIATION COEFFICIENT) | 2 |
| ... | ... |

SENSOR MANAGEMENT TABLE 52

| SENSOR TERMINAL NAME | CALIBRATION INFORMATION 52B | | | | | COMMU-NICATION SPEED (BYTES/SEC) | REMAINING BATTERY TIME (SEC) | THRESH-OLD VALUE | SENSOR IMPOR-TANCE |
|---|---|---|---|---|---|---|---|---|---|
| | START POINT COOR-DINATES | START POINT VALUE | END POINT COOR-DINATES | END POINT VALUE | CENTER POINT COOR-DINATES | | | | |
| SENSOR A | (20,90) | 0 | (80,90) | 100 | (30,50) | 100 | 3600 | 60 | HIGH |
| ... | ... | ... | ... | ... | ... | ... | ... | ... | ... |

PATTERN TABLE 54

| SETTING ITEM | VALUE |
|---|---|
| AREA POSITION | POSITIONS OF MEASURED VALUE AND THRESHOLD VALUES |
| AREA WIDTH | 100 |
| AREA HEIGHT | 100 |
| RESOLUTION (DPI) | 350 |
| NUMBER OF COLOR SPACES | 3 (COLORS) |
| ... | ... |

PATTERN PRIORITY MANAGEMENT TABLE 53

| PATTERN ID | PRIORITY |
|---|---|
| PATTERN 1 | 1 |
| PATTERN 2 | 2 |
| ... | ... |

53A      53B

SENSOR MANAGEMENT TABLE 52

MONITORING SYSTEM AND ITS CONTROL METHOD

TECHNICAL FIELD

The present invention relates to a monitoring system and its control method. Particularly, this invention is suited for use in a system for monitoring measured values of an analog meter provided in a monitoring object apparatus which is installed at a remote place.

BACKGROUND ART

Conventionally, monitoring of a monitoring object apparatus which uses an analog meter as a measuring instrument is performed by a customer engineer periodically visiting the relevant site and checking a measured value of the analog meter by visual observation. It is desirable that such work to check the measured value of the analog meter should be conducted with high frequency; however, this results in problems of cost escalation and a labor shortage due to aging of customer engineers.

As one method for solving such problems, there has been conventionally suggested a method of causing a fixed point camera to photograph an analog meter which is a monitoring object apparatus, thereby reading measured values of the analog meter by executing image analysis processing on captured images, and transferring the read result as data to, for example, a monitoring center (see, for example, PTL 1). Such a monitoring method has the advantage of being capable of monitoring a status of the monitoring object apparatus with good accuracy without increasing the costs or using manpower.

CITATION LIST

Patent Literature

PTL 1: Japanese Patent Application Laid-Open (Kokai) Publication No. 2002-56387

SUMMARY OF THE INVENTION

Problems to be Solved by the Invention

Meanwhile, when the above-described monitoring method is adopted and any abnormality in a measured value of the analog meter is detected, it is necessary to check images of the analog meter, which were captured by the fixed point camera, by visual observation in order for a worker to judge whether that abnormality was caused by an abnormal condition which actually happened or not, or whether that abnormality was caused by any failure or mistaken analysis of an apparatus which executed the image analysis processing.

However, generally a data volume of images is large and it requires time to transfer the data. Therefore, when the monitoring object apparatus is set somewhere deep in the mountains where there is no electricity or phone lines and the fixed point camera and communication equipment are driven by batteries, and there is no choice but to transfer the image data to a relay point by a wireless system of narrow communication bands, there is a problem of large battery consumption for data transfer of the images captured by the fixed point camera.

The present invention was devised in consideration of the above-described circumstances and aims at proposing a monitoring system and its control method capable of monitoring the monitoring object apparatus sufficiently for practical use while suppressing the power consumption of batteries.

Means to Solve the Problems

In order to solve the above-described problems, provided according to an aspect of the present invention is a monitoring system for monitoring a status of a monitoring object apparatus, wherein the monitoring system includes: a sensor terminal that is driven by a battery and acquires a measured value(s) of a measuring apparatus mounted in the monitoring object apparatus by executing image analysis processing on a captured image obtained by photographing the measuring apparatus; and a manager terminal that monitors the measured value of the measuring apparatus which is reported from the sensor terminal, wherein when the measured value of the measuring apparatus is out of a normal range, the manager terminal requests transmission of image data of an image area which is necessary and sufficient to check whether the measured value of the measuring apparatus is actually out of the normal range or not in the captured image from the sensor terminal by designating a range and resolution of the image area; and wherein the sensor terminal transmits the requested image data of the image area in the captured image with the requested resolution to the manger terminal in response to the request from the manager terminal.

Furthermore, according to an aspect of the present invention, provided is a method for controlling a monitoring system for monitoring a status of a monitoring object apparatus, wherein the monitoring system includes: a sensor terminal that is driven by a battery and acquires a measured value(s) of a measuring apparatus mounted in the monitoring object apparatus by executing image analysis processing on a captured image obtained by photographing the measuring apparatus; and a manager terminal that monitors the measured value of the measuring apparatus which is reported from the sensor terminal: and wherein the monitoring system control method includes: a first step executed, when the measured value of the measuring apparatus is out of a normal range, by the manager terminal requesting transmission of image data of an image area which is necessary and sufficient to check whether the measured value of the measuring apparatus is actually out of the normal range or not in the captured image from the sensor terminal by designating a range and resolution of the image area; and a second step executed by the sensor terminal transmitting the requested image data of the image area in the captured image with the requested resolution to the manger terminal in response to the request from the manager terminal.

When the monitoring system and its control method according to the present invention are employed, the data volume of the image data to be transferred from the sensor terminal to the manager terminal can be kept as small as possible.

Advantageous Effects of the Invention

The present invention can realize the monitoring system and its control method capable of monitoring the monitoring object apparatus sufficiently for practical use while suppressing the power consumption of the batteries.

BRIEF DESCRIPTION OF DRAWINGS

FIG. 4 is a chart illustrating a structure example of a sensor value storage table;

FIG. 5 is a chart illustrating a structure example of a threshold value determination condition table;

FIG. 6 is a chart illustrating a structure example of a sensor management table;

FIG. 8 is a chart illustrating a structure example of a pattern table;

FIG. 9 is a chart illustrating a structure example of a pattern priority management table;

DESCRIPTION OF EMBODIMENTS

An embodiment of the present invention will be described below in detail with reference to the drawings.

(1) Monitoring System Configuration According to This Embodiment

Figure 1:
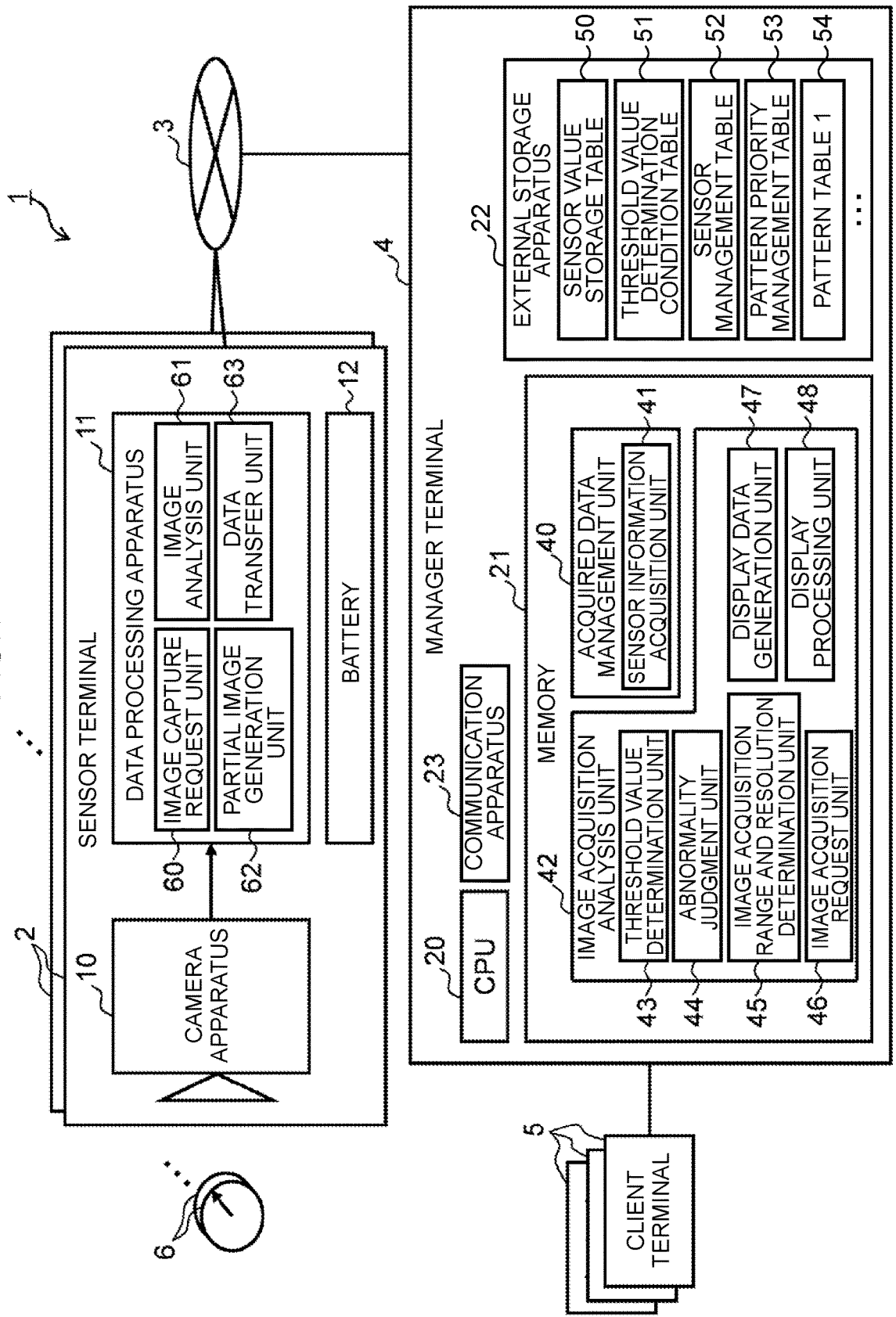
FIG. 1 is a block diagram illustrating an overall configuration of a monitoring system according to this embodiment.

Referring to FIG. 1, the reference numeral 1 represents a monitoring system according to this embodiment as a whole. This monitoring system 1: is a system for monitoring the status of a monitoring object apparatus which is installed at a remote place; and is configured by including one or more sensor terminals 2 which are set on the monitoring object apparatus side, a manager terminal 4 which is set at a monitoring center and is coupled to each sensor terminal 2 via a network 3, and one or more client terminals 5.

Each sensor terminal 2: is provided at each analog meter 6 which is set at the monitoring object apparatus and is associated with such each analog meter 6; and includes a camera apparatus 10 for photographing its corresponding analog meter 6, a data processing apparatus 11 for executing data processing on image data of captured images output from the camera apparatus 10, and a battery 12.

The camera apparatus 10 is composed of, for example, a general-purpose still image digital camera equipped with a flash device and is secured and set so that the camera apparatus 10 can photograph the relevant analog meter 6 from a fixed point position. The camera apparatus 10 photographs the relevant analog meter 6 in accordance with an instruction from the data processing apparatus 11 and outputs image data of a captured image(s) to the data processing apparatus 11.

The data processing apparatus 11 is composed of, for example, a computer device equipped with information processing resources such as a CPU (Central Processing Unit), a memory, and a communication apparatus. The data processing apparatus 11 activates the camera apparatus 10 in accordance with an instruction from the manager terminal 4 and causes the camera apparatus 10 to photograph the relevant analog meter 6. Then, the data processing apparatus 11 acquires a measured value of the analog meter 6 by executing image analysis processing on the captured image based on the image data, which has been then output from the camera apparatus 10, and transmits the acquired measured value to the manager terminal 4 via the network 3.

The battery 12 is a power source that supplies driving power to the camera apparatus and the data processing apparatus. For example, a secondary battery such as a lead storage battery capable of storing electric power generated by a solar photovoltaic device can be used as the battery 12.

The manager terminal 4: is a computer device for monitoring measured values of the analog meters 6, which are transmitted from each sensor terminal 2; and is composed of a general-purpose server apparatus equipped with a CPU 20, a memory 21, an external storage apparatus 22, and a communication apparatus 23.

The CPU 20 is a processor that controls the operation of the entire manager terminal 4. Furthermore, the memory 21 is composed of a semiconductor memory and is used to retain various kinds of programs. The external storage apparatus 22 is composed of a large-capacity nonvolatile storage apparatus such as hard disk drives and SSDs (Solid State Devices) and is used to save various kinds of programs and data for a long period of time. The communication apparatus 23 is composed of, for example, an NIC (Network Interface Card) and performs protocol control upon communication with the sensor terminals 2.

The manager terminal 4 analyzes measured values of the analog meters 6, which are sent from each sensor terminal 2, and monitors whether the relevant measured value of the analog meter 6 is within the normal range or not. Then, if the manager terminal 4 determines that the measured value of any one of the analog meters 6 is an abnormal value out of the normal range, it requests that the corresponding sensor terminal 2 should transfer image data of a captured image of the analog meter 6.

Furthermore, the manager terminal 4 causes the client terminal 5 to display the captured image of the analog meter 6 and a warning screen including information such as a graph representing changes in the measured value of the analog meter 6 for a certain period of time on the basis of the image data transmitted from the sensor terminal 2 according to the above-described request (hereinafter referred to as the image data transfer request).

The client terminal 5 is a computer device which is set inside the monitoring center or at a base outside the monitoring center and is used by an observer. The observer checks the status of the monitoring object apparatus based on the warning screen displayed on the client terminal 5 and visits the relevant site as necessary and inspects the monitoring object apparatus.

(2) Monitoring Technique According to This Embodiment

Next, a monitoring method according to this embodiment using the above-described monitoring system 1 will be explained. With this monitoring system 1 described above, when the manager terminal 4 determines that a measured value of the relevant analog meter 6, which has been transmitted from the sensor terminal 2, is an abnormal value, the manger terminal 4 issues an instruction to that sensor terminal 2 to transfer image data of a captured image of the analog meter 6.

In this case, a data volume of the image data is large and it requires a lot of time to transfer such image data. Accordingly, a considerable amount of electric power is required for the sensor terminal 2 to transfer the image data of the captured image of the camera apparatus 10 to the manager terminal 4 and the consumption of the battery 12 increases as much as the required amount of electric power. In this case, in consideration of the fact that the sensor terminal 2 has to regularly transmit measured values of the analog meter 6 to the manager terminal 4, it is desirable to perform the data transfer while suppressing the consumption of the battery 12 as much as possible when transferring the image data to the manager terminal 4.

Figure 2:
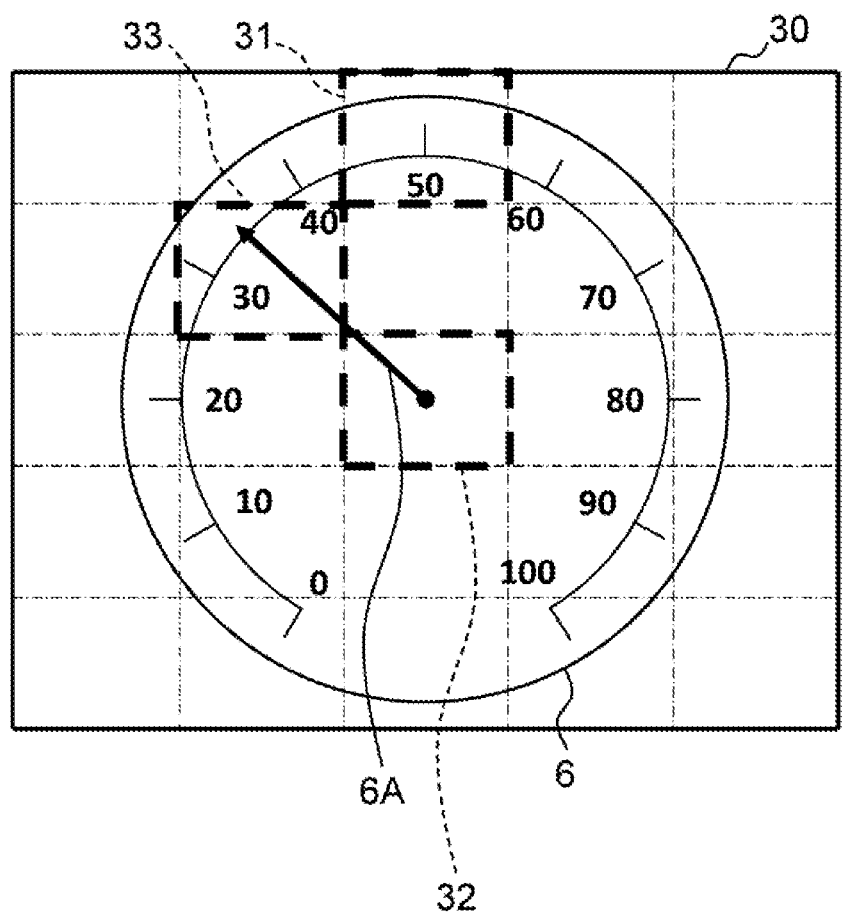
FIG. 2 is a diagram for explaining a monitoring method according to this embodiment.

On the other hand, for example, when the normal range of the measured value is from 45 to 55 with the analog meter 6 of a pointer rotation type whose pointer rotates as illustrated in FIG. 2, even only a partial image within a range surrounded by a broken-line frame line 31, which is a position range of a tip of a pointer 6A at least when the measured value of the analog meter 6 is within the normal range, in the entire captured image 30 of the camera apparatus 10 of the sensor terminal 2 (hereinafter referred to as the partial image), a partial image within a range surrounded by a broken-line frame line 32 including a rotation center part of the pointer 6A, or a partial image within a range surrounded by a broken-line frame line 33 including the tip of the pointer 6A of the analog meter 6 at that time can be used to check whether the measured value of the analog meter 6 is actually an abnormal value or not.

Figure 3A:
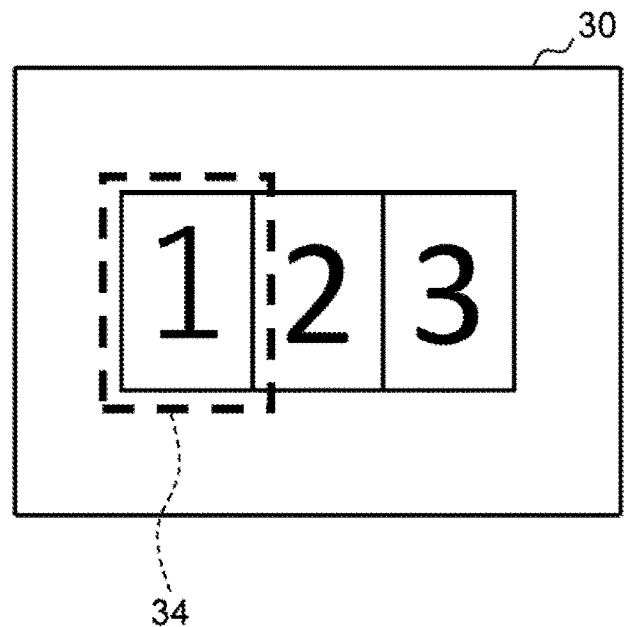
FIG. 3A and FIG. 3B are diagrams for explaining the monitoring method according to this embodiment.

Moreover, when the analog meter 6 is an analog meter of a drum rotation type which is composed of a plurality of rotating drums with numbers 0 to 9 displayed on their circumferential side surface as illustrated in FIG. 3A and when the normal range of the measured value is 100 or more or less than 100, even only a partial image within a range surround by a broken-line frame line 34 can be used to check whether the measured value of the analog meter 6 is actually the abnormal value or not.

Figure 3B:
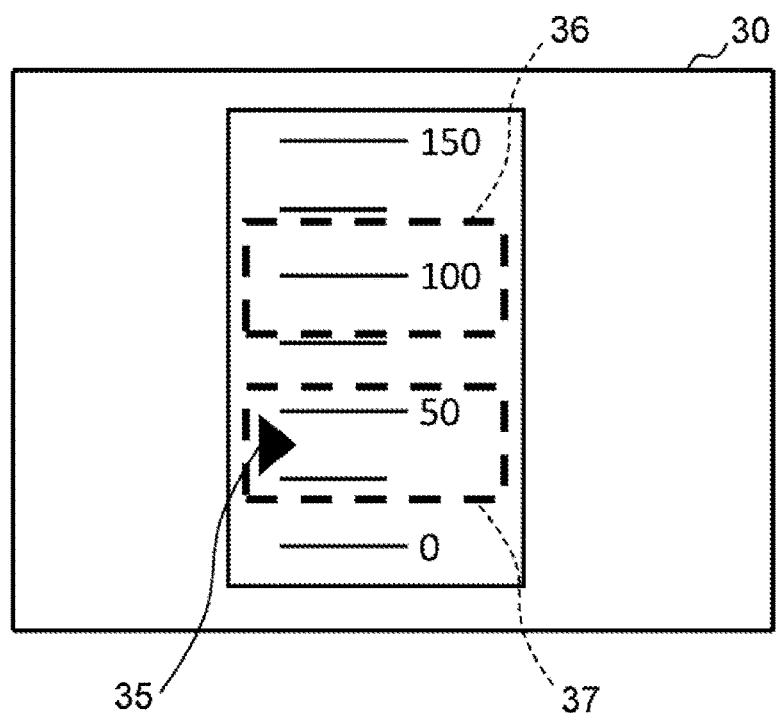

Furthermore, when the analog meter 6 is an analog meter of a pointer moving type whose pointer 35 moves as illustrated in FIG. 3B, even only a partial image within a range surrounded by a broken-line frame line 36 including a threshold values for the normal range ("100" in an example of FIG. 3B) or a partial image within a range surrounded by a broken-line frame line 37 including a current measured value of the analog meter 6 can be used to check whether the measured value of the analog meter 6 is actually the abnormal value or not.

Accordingly, we can say that regarding such a common analog meter 6, an image area in which a part or whole of the pointer appears in the captured image of the camera apparatus 10 when the measured value of the relevant analog meter 6 is within the normal range, or an image area in which a part or whole of the current pointer appears in the captured image of the camera apparatus 10 is the image area which is necessary and sufficient to check whether the measured value of the analog meter 6 is out of the normal range or not.

So, one of characteristics of the monitoring system 1 according to this embodiment is that: when the manager terminal 4 issues an instruction to the sensor terminal 2 to transfer the image data of the captured image of the analog meter 6, the manager terminal 4 designates the range and resolution of the image area (or the partial image), which is necessary and sufficient to check whether the measured value of the analog meter 6 is out of the normal range, in the captured image of the camera apparatus 10; and the sensor terminal 2 transfers the image data of the partial image within the range designated by the manager terminal 4 in the captured image of the camera apparatus 10 and with the designated the resolution to the manager terminal 4.

As a result, this monitoring system 1 can keep the data volume of the image data to be transferred from the sensor terminal 2 to the manager terminal 4 as small as possible and suppress the battery consumption of the sensor terminal 2, which is attributable to the transfer of the image data, as much as possible.

As a means for implementing the above-described monitoring method according to this embodiment, the memory 21 for the manager terminal 4 stores an acquired data management unit 40 and an image acquisition analysis unit 42 and the external storage apparatus 22 stores a sensor value storage table 50, a threshold value determination condition table 51, a sensor management table 52, a pattern priority management table 53, and a plurality of pattern tables 54.

The acquired data management unit 40: is a program having a function that acquires data from each sensor terminal 2 and manages the acquired data; and includes a sensor information acquisition unit 41. The sensor information acquisition unit 41 is a thread having a function that regularly issues an instruction to each sensor terminal 2 to report measured values of the relevant analog meter 6 and stores and manages the measured values of the analog meter 6, which have been transferred from each sensor terminal 2 in accordance with the above-described instruction (hereinafter referred to as the measured value report instruction), in the sensor value storage table 50.

Moreover, the image acquisition analysis unit 42 is a program having a function that: monitors measured values of analog meters 6, which are transferred from each sensor terminal 2 in accordance to the above-described measured value report instruction; and issues an instruction to the relevant sensor terminal 2 to transfer image data of a partial image of a captured image of the relevant analog meter 6 when abnormality of a measured value of any one of the analog meters 6 is detected. This image acquisition analysis unit 42 is configured by including a threshold value determination unit 43, an abnormality judgment unit 44, an image acquisition range and resolution determination unit 45, an image acquisition request unit 46, an display data generation unit 47, and a display processing unit 48.

The threshold value determination unit 43 is a thread having a function that determine the normal range of each analog meter 6 based on measured values of the analog meter 6 in the past, which are transmitted from each sensor terminal 2. Practically, the threshold value determination unit 43 determines a threshold value(s) for the normal range of the measured values (an upper limit value and/or a lower limit value of the normal range) for each analog meter 6 on the basis of the measured values of the analog meter 6, which were acquired in the past, and according to threshold value determination conditions stored in the threshold value determination condition table 51 as described later.

The abnormality judgment unit 44 is a thread having a function that judges whether each measured value transmitted from each sensor terminal 2 is an abnormal value or not (that is, whether the measured value is out of the normal range or not) based on the threshold value(s) for the normal range for each analog meter 6 which is determined by the threshold value determination unit 43.

Furthermore, the image acquisition range and resolution determination unit 45 is a thread having a function that determines the range and resolution of a partial image for which its transfer to the relevant sensor terminal 2 is to be requested, with respect to the analog meter 6 determined by the abnormality judgment unit 44 that its measured value is an abnormal value. The image acquisition range and resolution determination unit 45 determines the range and resolution of the partial image on the basis of various kinds of information stored in the sensor management table 52 described later and a transfer format of the partial image stored in the relevant pattern table 54.

The image acquisition request unit 46 is a thread having a function that requests the relevant sensor terminal 2 for acquisition and transfer of image data of the partial image with the range and resolution determined by the image acquisition range and resolution determination unit 45. Practically, the image acquisition request unit 46 requests the sensor terminal 2 for the transfer of the above-described partial image by transmitting the aforementioned image data transfer request, including the range and resolution of the partial image which are determined by the image acquisition range and resolution determination unit 45, to the relevant sensor terminal 2.

The display data generation unit 47 is a thread having a function that generates display data for displaying a warning screen including information such a graph representing changes in the measured value of the analog meter 6, regarding which abnormality is detected, for a certain period of time and the partial image of the captured image of that analog meter 6, which is acquired from the relevant sensor terminal 2.

Furthermore, the display processing unit 48 is a thread having a function that causes the client terminal 5 to display the warning screen based on the relevant display data by transferring the display data generated by the display data generation unit 47 to a necessary client terminal 5.

Meanwhile, the sensor value storage table 50 is a table used to retain and manage the measured values of the analog meter 6, which are collected from the sensor terminal 2, and is created for each sensor terminal 2.

This sensor value storage table 50 is configured by including a measurement date and time column 50A and a sensor value column 50B as illustrated in FIG. 4. With the sensor value storage table 50, one row corresponds to one piece of past data.

Then, the sensor value column 50B stores a measured value of the relevant analog meter 6, which was transmitted from the relevant sensor terminal 2 and read by the sensor terminal 2; and the measurement date and time column 50A stores the date and time when that measured value was measured. Therefore, in an example in FIG. 4, it is shown that the measure value of the relevant analog meter 6 which was measured "at 10:30:30 on Jan. 1, 2018" was "3600."

The threshold value determination condition table 51: is a table used to manage determination conditions to determine the threshold value(s) (an upper limit value and/or a lower limit value) for the normal range of the measured values of the analog meters 6 based on the past data (hereinafter referred to as the threshold value determination conditions); and is created by the user in advance. Incidentally, the threshold value determination condition table 51 may be created for each analog meter 6.

This threshold value determination condition table 51 is configured by including a condition item column 51A and a value column 51 B as illustrated in FIG. 5. With the threshold value determination condition table 51, one row corresponds to one condition item for determining the threshold values.

Then, the condition item column 51A stores specific condition items such as the number of days of the past data which should be used to determine the threshold values for the normal range of the measured value and a width (a coefficient of a standard deviation) upon determining the relevant threshold values; and the value column 51B stores a value which is set by the user regarding the corresponding condition item. Therefore, in a case of an example in FIG. 5, it is shown that the upper and lower limit values which are the threshold values should be calculated by using an average value and a standard deviation of the past data for the recent "30" days, and the coefficient "2" of the standard deviation. The width of the upper and lower limit values can be changed by the standard deviation coefficient and is used to adjust abnormality detection occurrence frequency.

The sensor management table 52: is a table used by the manager terminal 4 to manage each sensor terminal 2; and is configured by including a sensor terminal name column 52A, a calibration information column 52B, a communication speed column 52C, a remaining battery time column 52D, a threshold value column 52E, and a sensor importance column 52F as illustrated in FIG. 6. With the sensor management table 52, one row corresponds to one sensor terminal 2.

Then, the sensor terminal name column 52A stores a name (sensor terminal name) which is assigned to the relevant sensor terminal 2 and is proper to that sensor terminal 2.

Furthermore, the calibration information column 52B is divided into a start point coordinates column 52BA, a start point value column 52BB, an end point coordinates column 52BC, an end point value column 52BD, and a center point coordinates column 52BE. Then, the start point coordinates column 52BA stores a coordinate position which is a start point for a movable range of the pointer 6A (FIG. 2) of the relevant analog meter 6 in the captured image of the relevant sensor terminal 2; and the start point value column 52BB stores a measured value of the analog meter 6 when the pointer 6A is located at that coordinate position.

Furthermore, the end point coordinates column 52BC stores a coordinate position which is an end point for the movable range of the pointer 6A of the relevant analog meter 6 in the captured image of the relevant sensor terminal 2; and the end point value column 52BD stores a measured value of the analog meter 6 when the pointer 6A is located at that coordinate position. Furthermore, the center point coordinates column 52BE stores coordinates of a rotation center of the pointer of the analog meter 6 in the captured image of the relevant sensor terminal 2.

Figure 7:
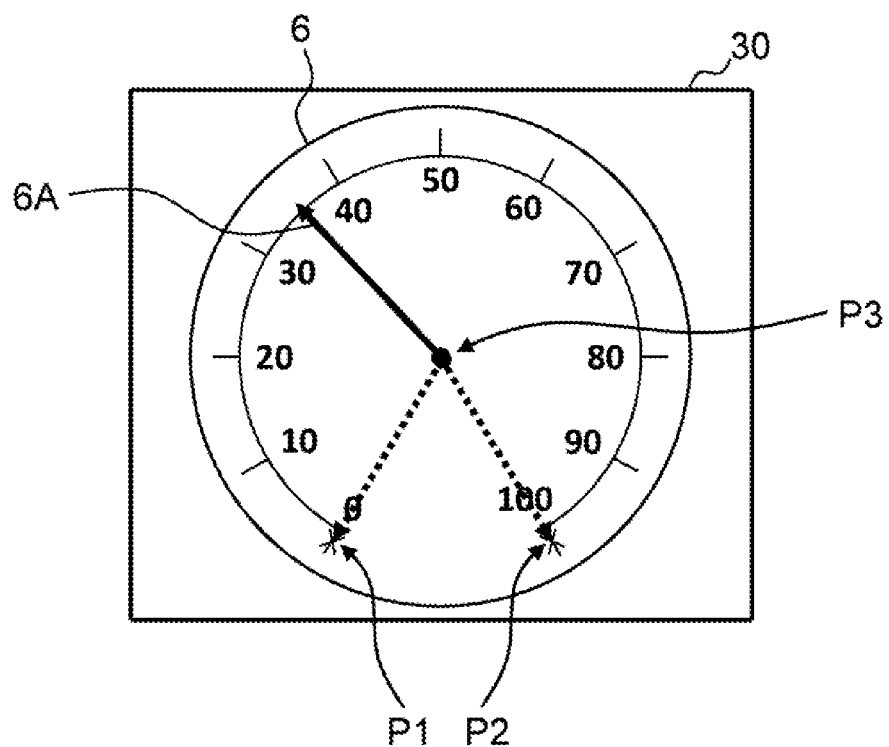
FIG. 7 is a diagram for explaining the sensor value storage table.

For example, in a case of the sensor terminal 2 which photographs the analog meter 6 of the pointer rotation type as illustrated in FIG. 7, a coordinate position represented by P1 in the captured image 30 is the coordinate position which is the start point of the movable range of the pointer 6A, so that these coordinates are stored in the start point coordinates column 52BA; and since the then measured value of the analog meter 6 is "0," this value is stored in the start point value column 52BB.

Furthermore, a coordinate position represented by P2 in the captured image 30 is the coordinate position which is the end point of the movable range of the pointer 6A, so that there coordinates are stored in the end point coordinates column 52BC; and since the then measured value of the analog meter 6 is "100," this value is stored in the end point value column 52BD. Furthermore, since a coordinate position represented by P3 in the captured image 30 is the rotation center of the pointer 6A, these coordinates are stored in the center point coordinates column 52BE.

Incidentally, corresponding coordinates and values are set by the user in advance, respectively, to the start point coordinates column 52BA, the start point value column 52BB, the end point coordinates column 52BC, the end point value column 52BD, and the center point coordinates column 52BE of the calibration information column 52B.

The communication speed column 52C stores a communication speed of a communication path to the relevant sensor terminal 2, which was measured at the time of last communication with that sensor terminal 2; and the remaining battery time column 52D stores an estimated value of remaining time of the batter 12 (FIG. 1) of that sensor terminal 2, which was acquired from the sensor terminal 2 last time.

Incidentally, a method for acquiring the estimated value of the remaining time of the battery 12 may be: a method executed by the manager terminal 4 to periodically acquire the estimated value from the sensor terminal 2; or a method executed by the sensor terminal 2, when reporting the measured value of the analog meter 6 to the manager terminal 4, to report the remaining time of the battery 12 of its own sensor terminal, together with the relevant measured value, to the manager terminal 4. In the following explanation, it is assumed that the manager terminal 4 acquires the remaining time of the batter 12 of each sensor terminal 2 by the latter method.

The threshold value column 52E stores a threshold value(s) (an upper limit value and/or a lower limit value) for the normal range of the measured value, which is determined by the threshold value determination unit 43 (FIG. 1) as described earlier; and the sensor importance column 52F stores importance of the analog meter 6, regarding which its measured value is measured by the relevant sensor terminal 2 and the importance is set by the user in advance. Incidentally, such importance may be, for example, of two levels "high" and "low," or three levels "high," "medium," and "low," or four levels or more.

Therefore, in the case of the example in FIG. 6, it is shown that regarding the sensor terminal 2 with the sensor terminal name "sensor A": the start point coordinates of the pointer 6A of the target analog meter 6 in the captured image are "(20, 90)"; the measured value when the pointer 6A is located at the start point coordinates is "0"; the end point coordinates of the pointer are "(80, 90)"; the measured value when the pointer 6A is located at the end point coordinates is "100"; and the coordinates of the rotation center of the pointer 6A are "(30, 50)." Furthermore, FIG. 6 shows that: the communication speed of the communication path to the sensor terminal 2, which was measured last time, is "100" (bytes/sec); the remaining time of the battery 12 which was acquired from the sensor terminal 2 last time is "3600" (sec); the threshold value for the normal range of the analog meter 6 is "60"; and the importance of the analog meter 6 which is set by the user is "high."

The pattern table 54 is a table used to manage a transfer format of the aforementioned partial image which is set by the user in advance (hereinafter referred to as the transfer pattern) and is created for each transfer pattern which is set by the user.

This pattern table 54 is configured by including a setting item column 54A and a value column 54B as illustrated in FIG. 8. Then, the setting item column 54A stores an item name of each setting item regarding the transfer pattern of the partial image; and the value column 54B stores a value which is set by the user for the relevant setting item.

Incidentally, in a case of this embodiment, an "Area Position," "Area Width," "Area Height," "Resolution," "Color Space," and so on are defined as such setting items. The "Area Position" represents the position of a partial image in the captured image of the sensor terminal 2 to be transferred to the manager terminal 4. Furthermore, the "Area Width" represents the pixel number in a transverse direction of the partial image; and the "Area Height" represents the pixel number in a longitudinal direction of the partial image. Furthermore, the "Resolution" represents the resolution of the relevant partial image when the sensor terminal 2 transmits the image data of that partial image to the manager terminal 4; and the "Number of Color Spaces" represents the number of color spaces for that partial image.

Therefore, regarding the relevant transfer pattern in a case of an example in FIG. 8, it is shown that the following settings are set: the relevant analog meter 6 is photographed by using "3 (colors)" as the number of color spaces; partial images of the width "100" (pixels) and the height "100" (pixels) are cut out at the "Position of Measured Value" (the current position of the pointer) in the captured image and at the "Positions of Threshold Values" (the positions of the threshold values for the normal range, which are set regarding the analog meter 6); and the image data of the partial images are to be transferred with the resolution of "350" (dpi).

The pattern priority management table 53 is a table used to manage the priority of each transfer pattern which is set by the user in advance. This pattern priority management table 53 may be set for each sensor terminal 2 or set commonly for all the sensor terminals 2.

The pattern priority management table 53 is configured by including a pattern ID column 53A and a priority column 53B as illustrated in FIG. 9. Then, the pattern ID column 53A stores a unique identifier of the relevant transfer pattern (pattern ID) which is set by the user in advance and is assigned to each aforementioned transfer pattern; and the priority column 53B stores the priority which is set by the user with respect to the relevant transfer pattern. Therefore, in a case of an example in FIG. 9, it is shown that a priority "1" is set to a transfer pattern "Pattern 1" and a priority "2" is set to a transfer pattern "Pattern 2," respectively.

Meanwhile, referring to FIG. 1, a memory (not shown in the drawing) for the data processing apparatus 11 of the sensor terminal 2 stores an image capture request unit 60, an image analysis unit 61, a partial image generation unit 62, and a data transfer unit 63.

The image capture request unit 60 is a thread having a function that activates the camera apparatus 10 and causes it to photograph the relevant analog meter 6 in accordance with the measured value report instruction and the image data transfer request from the manager terminal 4 as described earlier. The camera apparatus 10 outputs the image data of the captured image of the photographed analog meter 6 to the data processing apparatus 11.

Furthermore, the image analysis unit 61 is a thread having a function that then acquires the measured value of the relevant analog meter 6 by means of the image analysis processing based on the image data given from the camera apparatus 10 as described above when the measured value report instruction is given from the manager terminal 4.

Furthermore, the partial image generation unit 62 is a thread having a function that generates the image data of the partial image with the range and resolution designated by the relevant image data transfer request from the captured image based on the image data given from the camera apparatus 10 as described above when the image data transfer request is given from the manager terminal 4.

The data transfer unit 63 is a thread having a function that transmits, to the manager terminal 4 via the network 3: the measured value of the analog meter 6 acquired from the image analysis unit 61 when the measured value report instruction is given from the manager terminal 4; and the image data of the partial image generated by the partial image generation unit 62 when the image data transfer request is given from the manager terminal 4.

(3) Processing Regarding Monitoring Method According to This Embodiment

Next, specific processing content of the monitoring processing executed by the manager terminal 4 in relation to the monitoring method according to this embodiment will be explained. Incidentally, the following explanation will be given by referring to a "thread" as a processing subject of various kinds of processing; however, needless to say, the processing is practically executed by the CPU 20 (FIG. 1) of the manager terminal 4 on the basis of that thread.

(3-1) Monitoring Processing

Figure 10:
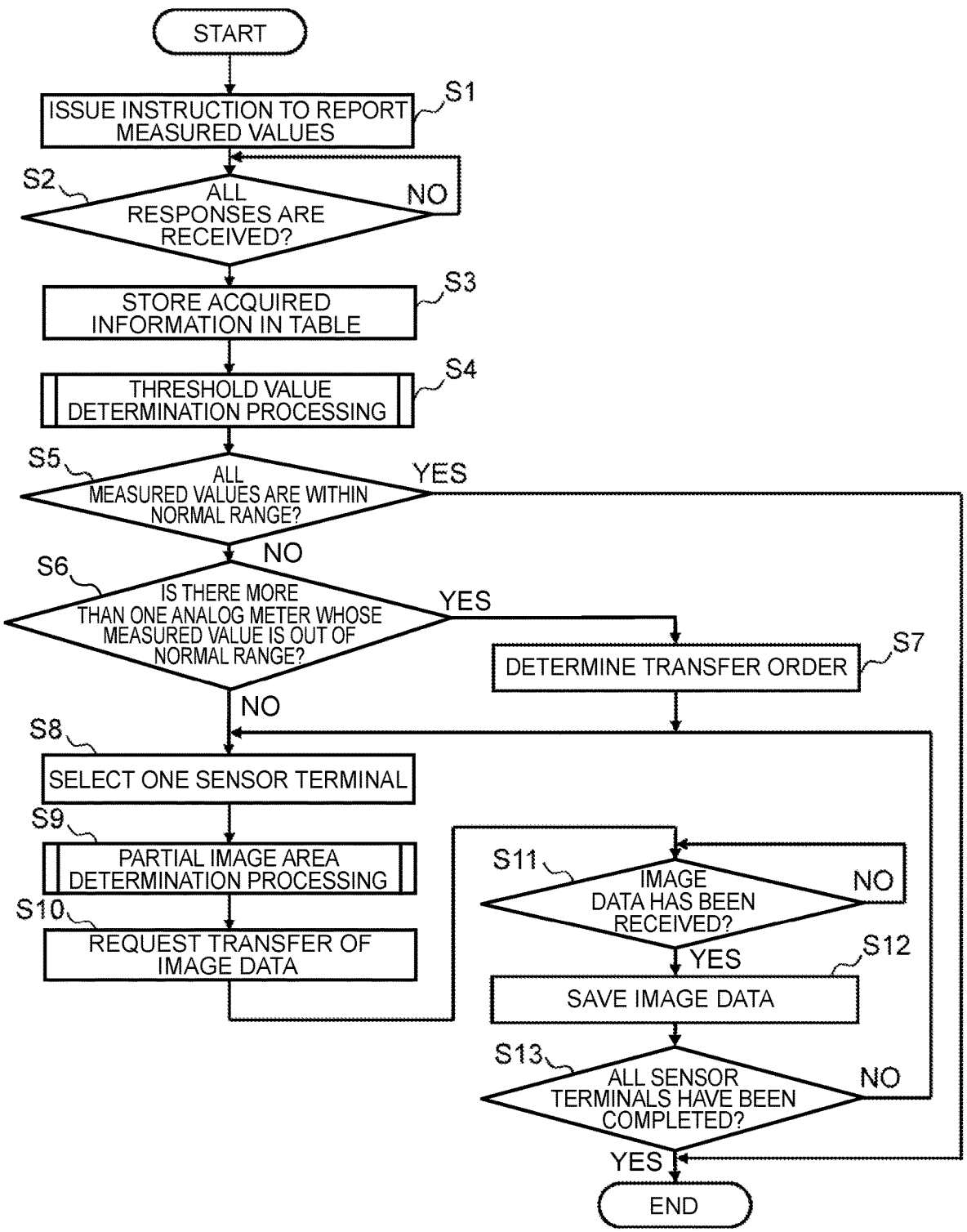
FIG. 10 is a flowchart illustrating a processing sequence for monitoring processing.

FIG. 10 illustrates a processing sequence for the monitoring processing executed by the manager terminal 4 in relation to the monitoring method. The manager terminal 4 collects measured values of the analog meters 6 from each sensor terminal 2 and acquires the image data of a partial image of the relevant analog meter 6 from the corresponding sensor terminal 2 with regard to the analog meter 6 whose measured value is out of the normal range, in accordance with a processing sequence illustrated in this FIG. 10.

Practically, the manager terminal 4 periodically starts the monitoring processing illustrated in this FIG. 10; and firstly, the sensor information acquisition unit 41 (FIG. 1) for the acquired data management unit 40 (FIG. 1) issues an instruction (measured value report instruction) to each sensor terminal 2 to report a measured value of the relevant analog meter 6 (S1) and then waits for each sensor terminal 2 to return a response (S2).

Thus, having received this measured value report instruction, each sensor terminal 2 causes the camera apparatus 10 (FIG. 1) to photograph the relevant analog meter 6, acquires a measured value of the analog meter 6 by causing the data processing apparatus 11 (FIG. 1) to execute image analysis processing on a captured image of the analog meter 6, and transmits the acquired measured value and the remaining time of the battery 12 at that time, as a response to the measured value report instruction, to the manager terminal 4.

Then, after the response to the measured value report instruction is returned from the sensor terminal 2, the sensor information acquisition unit 41 stores the then-acquired measured value of the analog meter 6 in the sensor value storage table 50 (FIG. 4). Furthermore, the sensor information acquisition unit 41 stores the remaining time of the battery 12 of the sensor terminal 2 and a then-measured communication speed of the communication path to that sensor terminal 2, which are included in the response, respectively in a row corresponding to the sensor terminal 2 of the remaining battery time column 52D (FIG. 6) and the communication speed column 52C (FIG. 6) of the sensor management table 52 (FIG. 6) (S3). Then, when the sensor information acquisition unit 41 eventually finishes receiving responses from all the sensor terminals 2, it activates the threshold value determination unit 43 (FIG. 1).

After the threshold value determination unit 43 is activated by the sensor information acquisition unit 41, it executes threshold value determination processing for determining the threshold value(s) (the upper limit value and/or the lower limit value) for the normal range for each analog meter 6 on the basis of the past data stored in the sensor value storage table 50, which is associated with each sensor terminal 2, and registering each of the determined threshold values in the sensor management table 52 (S4). The details of this threshold value determination processing will be described later. Subsequently, the threshold value determination unit 43 activates the abnormality judgment unit 44 (FIG. 1).

After the abnormality judgment unit 44 is activated by the threshold value determination unit 43, it judges whether all the then-acquired measured values of each analog meter 6 are within the normal range or not, based on the threshold values for the normal range which are set for each analog meter 6 registered in the sensor management table 52 (S5). Then, if the abnormality judgment unit 44 obtains an affirmative result in this judgment, it terminates the processing. As a result, this sequence of the monitoring processing terminates.

On the other hand, if the abnormality judgment unit 44 obtains a negative result in the judgment of step S5, it judges whether or not there is more than one analog meter 6 whose measured value is out of the normal range (S6). Then, if the abnormality judgment unit 44 obtains a negative result in this judgment, it activates the image acquisition range and resolution determination unit 45.

Furthermore, if the abnormality judgment unit 44 obtains an affirmative result in the judgment of step S6, it obtains the priority of each sensor terminal 2 corresponding to the analog meter 6, whose measured value is out of the normal range, from the corresponding sensor importance column 52F (FIG. 6) of the sensor management table 52 and determines the order of the sensor terminals 2, to which the image data should be transferred, on the basis of the obtained priorities of these sensor terminals 2 (S7).

Figure 11:
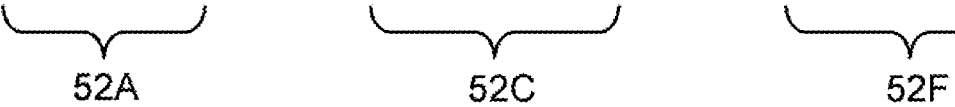
FIG. 11 is a chart for explaining an image data transfer order determination method.

Specifically speaking, the abnormality judgment unit 44 determines the transfer order of the image data of each relevant sensor terminal 2 so that: the image data of the sensor terminal 2 with a higher priority will be transferred earlier in the transfer order on the basis of the priority of each relevant sensor terminal 2 (each sensor terminal 2 regarding which the measured value of the relevant analog meter 6 is out of the normal range) which is acquired from the sensor management table 52; and regarding the sensor terminals 2 with the same importance, the image data of the sensor terminal in a better communication state will be transferred earlier in the transfer order. Therefore, for example, when the pattern table 54 is in a state as illustrated in FIG. 11 and there are three sensor terminals 2, "Sensor A," "Sensor B," and "Sensor C," regarding which the measured value of the relevant analog meter 6 is out of the normal range, the transfer order of the image data will be determined as in the order of "Sensor B," "Sensor A," and "Sensor C."

Subsequently, the abnormality judgment unit 44 activates the image acquisition range and resolution determination unit 45 (FIG. 1) and notifies the image acquisition range and resolution determination unit 45 of the sensor terminal name of each sensor terminal 2 and their transfer order which were determined in step S7.

After the image acquisition range and resolution determination unit 45 is activated by the abnormality judgment unit 44, it firstly selects one sensor terminal whose image data should be acquired (S8). Practically, if a negative result is obtained in step S6 and the image acquisition range and resolution determination unit 45 is activated, it selects the sensor terminal 2 corresponding to the analog meter 6 whose then-measured value indicates an abnormal value. Furthermore, when the image acquisition range and resolution determination unit 45 is activated and then notified by the abnormality judgment unit 44 of the transfer order of the sensor terminals 2, it selects a sensor terminal 2 which is unprocessed and is listed as the earliest regarding the reported transfer order.

Subsequently, the image acquisition range and resolution determination unit 45 executes partial image area determination processing for determining the range and resolution of the partial image for which the image data in the captured image of the sensor terminal 2 selected in step S8 is to be transferred (S9). The details of this partial image area determination processing will be described later. Subsequently, the image acquisition range and resolution determination unit 45 activates the image acquisition request unit 46 (FIG. 1) and reports the sensor terminal 2 selected in step S8 and the range and resolution of the partial image which were determined in step S9.

After the image acquisition request unit 46 is activated, it transmits an image data transfer request including the range and resolution of the partial image reported from the image acquisition range and resolution determination unit 45 to the sensor terminal 2 reported from the image acquisition range and resolution determination unit 45 (S10) and then waits for the image data to be transmitted from that sensor terminal 2 (S11).

Then, when the image data of the partial image is eventually transferred from that sensor terminal 2, the image acquisition request unit 46 associates this image data with the sensor terminal 2 and stores and saves it in the external storage apparatus 22 (FIG. 1) (S12) and then judges whether or not it has finished collecting the image data of partial images from all the sensor terminals 2 from which the image data should be collected then (the sensor terminals 2 whose measured values of the relevant analog meter 6 are abnormal values) (S13).

Then, if the image acquisition request unit 46 obtains a negative result in this judgment, it returns to step S8 and invokes the image acquisition range and resolution determination unit 45. As a result, the processing of step S8 to step S13 is executed in the same manner as described above and the image data from each relevant sensor terminal 2 is thereby sequentially saved in the external storage apparatus 22.

Then, when the image acquisition request unit 46 eventually obtains an affirmative result in step S13 by finishing collecting the image data of the partial images from all the sensor terminals 2 whose measured values of the relevant analog meter 6 are abnormal values, it then activates the display data generation unit 47 and terminates the processing. As a result, this sequence of the monitoring processing terminates.

Incidentally, after the display data generation unit 47 is activated by the image acquisition request unit 46, it generates screen data of a warning screen including, for example, a graph representing changes in the measured value of the analog meter 6 up until that time and the partial image based on the image data of the analog meter 6 acquired as described above, with respect to each analog meter 6 whose measured value is the abnormal value, and transmits the generated screen data to the display processing unit 48 (FIG. 1).

Then, the display processing unit 48 transmits the screen data, which has been given from the display data generation unit 47, to a necessary client terminal 5 and thereby causes that client terminal 5 to display the aforementioned warning screen based on the relevant screen data. As a result, the observer can visually check the current status of the analog meter 6 whose measured value has exceeded the normal range.

(3-2) Threshold Value Determination Processing

Figure 12:
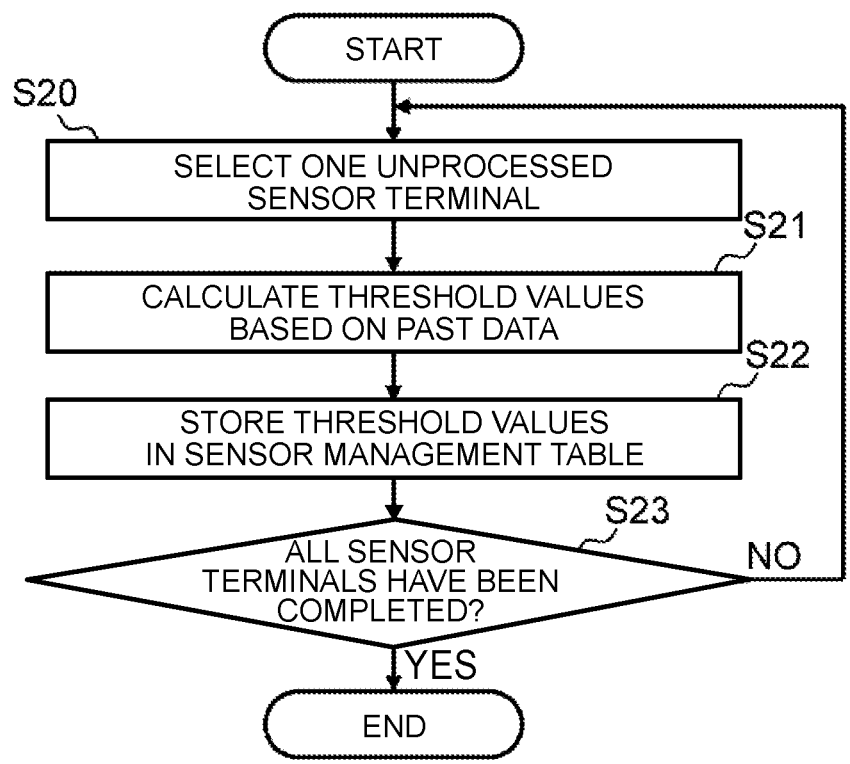
FIG. 12 is a flowchart illustrating a processing sequence for threshold value determination processing.

FIG. 12 illustrates specific processing content of the threshold value determination unit 43 in step S4 of the monitoring processing. The threshold value determination unit 43 determines the threshold value(s) (the upper limit value and/or the lower limit value) for the normal range of each analog meter 6 according to a processing sequence illustrated in this FIG. 12.

Practically, after the threshold value determination unit 43 is activated by the sensor information acquisition unit 41, it starts the threshold value determination processing illustrated in this FIG. 12 and firstly selects one sensor terminal 2 on which processing of step S21 and subsequent steps have not been executed yet (S20).

Subsequently, the threshold value determination unit 43 calculates the threshold value(s) (the upper limit value and/or the lower limit value) for the measured value of the analog meter 6 corresponding to the sensor terminal 2 on the basis of the past data from the sensor terminal 2 selected in step S20 stored in the corresponding sensor value storage table 50 (FIG. 4) (S21).

Specifically speaking, the threshold value determination unit 43 firstly reads past measured values, which are acquired from the sensor terminal 2 selected in step S20, from the sensor value storage table 50. When this happens, the threshold value determination unit 43 selectively reads the required number of pieces of the most recent past data from the past data (measured values) acquired at the same or almost the same time of day as the current time of day. This is performed in order to set an optimum threshold value to the current time of day when the measured values observed in one day are cyclic in nature. Furthermore, a threshold value(s) which would be also appropriate even when the measured value changes along with changes with time can be set by using more recent past data from among the past data as described above.

Incidentally, when the measured value changes on a weekly cycle, a monthly cycle, or an annual cycle, the past data (measured values) acquired at the same or almost the same time of day on the same day of week, at the same or almost the same time of day on the same date of each month, or at the same or almost the same time of day on the same date of the same month may be read selectively.

Subsequently, the threshold value determination unit 43 reads all the threshold value determination conditions from the threshold value determination condition table 51 (FIG. 5) and calculates the threshold value(s) for the measured value of the analog meter 6 corresponding to the sensor terminal 2 selected in step S20 so that these threshold value determination conditions which have been read will be satisfied (S21).

For example, when the threshold value determination condition which has been read from the threshold value determination condition table 51 is to "calculate the threshold value(s) by using an average value of the past data of past 30 days and a value obtained by multiplying a standard deviation by a coefficient 2," the threshold value determination unit 43 uses the following expression Math. 1 to calculate the upper limit value and the following expression Math. 2 to calculate the lower limit value.

[Math. 1]

$$\text{Upper Limit Value} = \text{Average Value} + \text{Standard Deviation} \times \text{Coefficient} \quad (1)$$

[Math. 2]

$$\text{Lower Limit Value} = \text{Average Value} - \text{Standard Deviation} \times \text{Coefficient} \quad (2)$$

However, it is possible to set a threshold value setting condition specifying that "if there is no change in the measured value during a designated period of time, it should be determined to be abnormal"; and the abnormality judgment unit 44 may detect abnormality in accordance with this threshold value setting condition. Furthermore, settings may be set so that a fixed value(s) designated by the user can be set as the threshold value(s).

Next, the threshold value determination unit 43: stores the threshold value(s) (the upper limit value and/or the lower limit value), which was calculated in step S22, in a row corresponding to the sensor terminal 2 selected in step S20 of the threshold value column 52E (FIG. 6) in the sensor management table 52 (FIG. 6) (S22); and then judges whether or not the execution of the processing of step S21 and step S22 has been completed with respect to all the sensor terminals 2 (S23).

Then, if the threshold value determination unit 43 obtains a negative result in this judgment, it returns to step S20 and then repeats the processing of step S20 to step S23 by sequentially switching the sensor terminal 2 to be selected in step S20 to another unprocessed sensor terminal 2 on which the processing of step S21 and subsequent steps has not been executed yet.

Then, when the threshold value determination unit 43 eventually obtains an affirmative result in step S23 by finishing determining the threshold values for the normal range of the measured value of the analog meter 6 corresponding to each sensor terminal 2, it terminates this threshold value determination processing.

(3-3) Image Acquisition Range and Resolution Determination Processing

Figure 13:
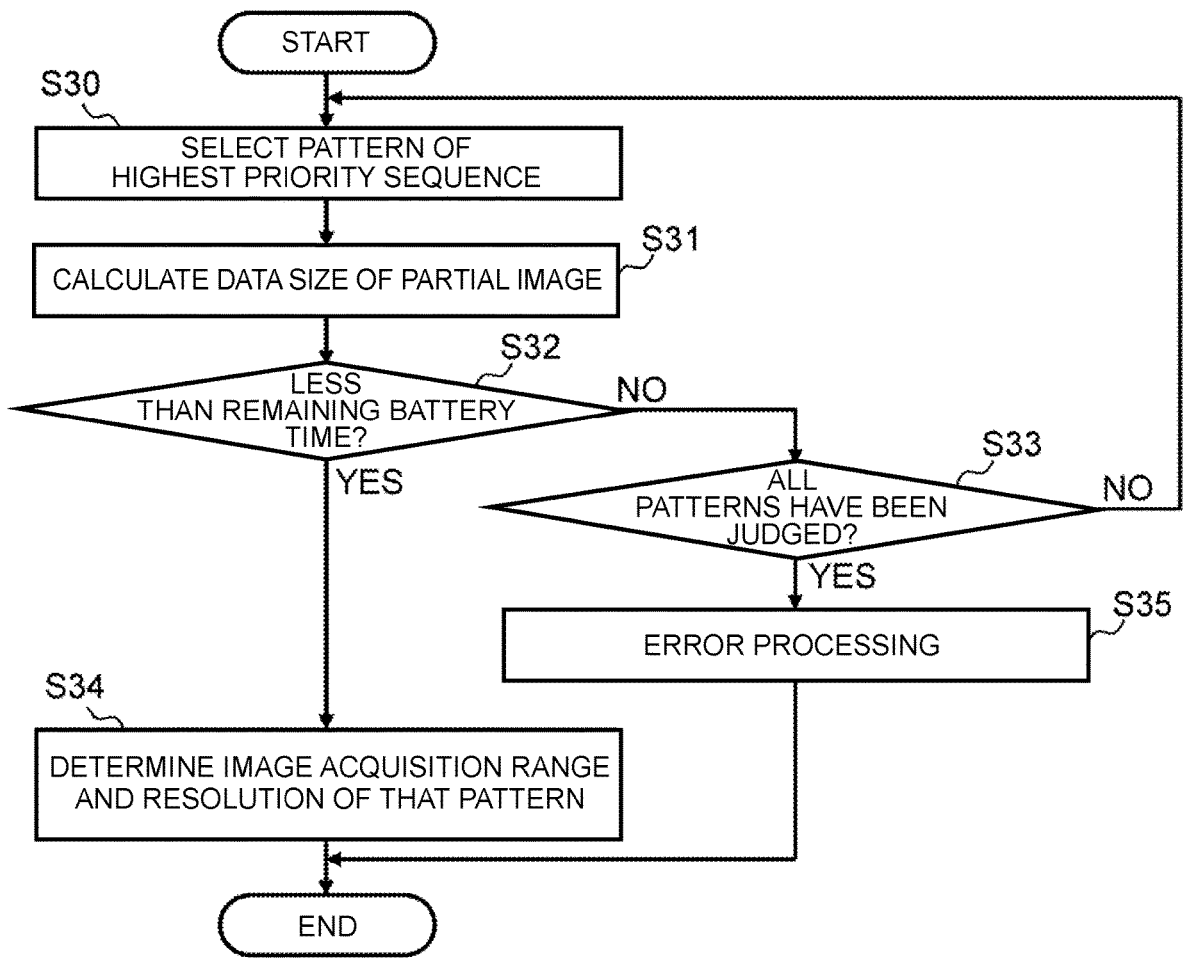
FIG. 13 is a flowchart illustrating a processing sequence for image acquisition range and resolution determination processing.

Meanwhile, FIG. 13 illustrates a processing sequence for the image acquisition range and resolution determination processing executed by the image acquisition range and resolution determination unit 45 (FIG. 1) in step S9 of the monitoring processing explained earlier with reference to FIG. 10. The image acquisition range and resolution determination unit 45 determines each of the range and resolution of a partial image to be transferred with respect to each analog meter 6, regarding which its then-measured value is out of the normal range, in accordance with a processing sequence illustrated in this FIG. 13.

Practically, when the image acquisition range and resolution determination unit 45 proceeds to step S9 in FIG. 10, it starts the image acquisition range and resolution determination processing illustrated in this FIG. 13 and firstly selects a transfer pattern in which the then-targeted sensor terminal 2 is assigned the highest priority, from among transfer patterns on which processing of step S31 and subsequent steps has not been executed yet, by referring to the pattern priority management table 53 (FIG. 9) (S30).

Subsequently, the image acquisition range and resolution determination unit 45 calculates the data size of a partial image, which is to be then acquired and is defined by the pattern table 54 (FIG. 8) corresponding to the transfer pattern selected in step S30, by referring to that pattern table 54 (FIG. 8) (S31).

Next, the image acquisition range and resolution determination unit 45: reads the communication speed, which is stored in a row of the communication speed column 52C (FIG. 6) corresponding to the then-targeted sensor terminal 2 in the sensor management table 52 (FIG. 6), and the remaining time of the battery 12 which is stored in the same row of the remaining battery time column 52D (FIG. 6); and judges, based on these pieces of read information, whether time required to transmit the partial image of the data size calculated in step S31 from the sensor terminal 2 to the manager terminal 4 is less than the remaining time of the battery 12 for that sensor terminal 2 (S32).

Specifically speaking, this judgment is made by judging whether the data size calculated in step S31 satisfies the following expression or not.

[Math. 3]

$$\text{Remaining Time of Battery} > \text{Data Size}/\text{Communication Speed} \quad (3)$$

Furthermore, if the image acquisition range and resolution determination unit 45 obtains a negative result in the judgment of step S32, it judges whether or not the execution of the processing of step S31 and step S32 has been completed with respect to all the transfer patterns defined by the pattern priority management table 53 regarding the then-targeted sensor terminal 2 (S33).

Then, if the image acquisition range and resolution determination unit 45 obtains a negative result in this judgment, it returns to step S30 and then repeats a loop from step S30 to step S33 until it obtains an affirmative result in step S32 or step S33.

Then, when the image acquisition range and resolution determination unit 45 eventually obtains an affirmative result in the judgment of step S32, it calculates a coordinate position of the partial image in accordance with the conditions defined in the pattern table 54 corresponding to the transfer pattern then selected in step S30 and determines the calculated coordinate position and the resolution defined by the relevant pattern table 54 as the range and resolution of the partial image (S34). Subsequently, the image acquisition range and resolution determination unit 45 terminates this image acquisition range and resolution determination processing.

On the other hand, if the image acquisition range and resolution determination unit 45 obtains an affirmative result in the judgment of step S33, the image acquisition range and resolution determination unit 45: executes error processing by, for example, causing the display data generation unit 47 (FIG. 1) to generate the screen data of the warning screen which indicates a warning stating that an image of the relevant analog meter 6 cannot be acquired, causing the display processing unit 48 to transmit the generated screen data to a necessary client terminal 5, and causing that client terminal 5 to display the above-described warning screen (S35); and then terminates this image acquisition range and resolution determination processing.

(4) Advantageous Effects of This Embodiment

Regarding the monitoring system 1 according to this embodiment described above, when a measured value of an analog meter 6, which is reported from the sensor terminal 2, is out of the normal range, the manager terminal 4 requests transmission of image data of a partial image, which is necessary and sufficient to check whether the measured value of that analog meter 6 is actually out of the normal range or not, from the relevant sensor terminal 2 by designating the range and resolution of the partial image; and the sensor terminal 2 transmits the image data of the requested partial image in the captured image 30 with the requested resolution to the manager terminal 4 in response to the above-described request from the manager terminal 4.

Therefore, this monitoring system 1 can keep the data volume of the image data to be transferred from the sensor terminal 2 to the manager terminal 4 as small as possible and monitor the monitoring object apparatus sufficiently for practical use while suppressing the battery consumption of the sensor terminal 2, which is attributable to the transfer of the image data, as much as possible.

(5) Other Embodiments

Incidentally, the aforementioned embodiment has described the case where the analog meter 6 is an analog meter of the pointer rotation type; however, the present invention is not limited to this example and can be applied to a wide variety of analog meters 6 which are measuring apparatuses of types other than the pointer rotation type.

Furthermore, the aforementioned embodiment has described the case where the data processing apparatus 11 is provided separately from the camera apparatus 10 in the sensor terminal 2; however, the present invention is not limited to this example and the camera apparatus 10 may be equipped with all the functions of the data processing apparatus 11.

Furthermore, the aforementioned embodiment has described the case where the camera apparatus 10 is composed of the general-purpose still image digital camera equipped with the flash device; however, the present invention is not limited to this example and the camera apparatus 10 may be equipped with a lighting device other than the flash device for the purpose of photographing during night.

INDUSTRIAL APPLICABILITY

The present invention can be applied to a wide variety of monitoring systems for monitoring the status of monitoring object apparatuses.

REFERENCE SIGNS LIST

1: monitoring system
2: sensor terminal
4: manager terminal
5: client terminal
6: analog meter
6A: pointer
10: camera apparatus
11: data processing apparatus
12: battery
20: CPU
30: captured image
40: acquired data management unit
41: sensor information acquisition unit
42: image acquisition analysis unit
43: threshold value determination unit
44: abnormality judgment unit
45: image acquisition range and resolution determination unit
46: image acquisition request unit
50: sensor value storage table
51: threshold value determination condition table
52: sensor management table
53: pattern priority management table
54: pattern table

The invention claimed is:

1. A monitoring system for monitoring a status of a monitoring object apparatus, the monitoring system comprising:
   a sensor terminal that is driven by a battery and acquires a measured value or measured values of a measuring apparatus mounted in the monitoring object apparatus by executing image analysis processing on a captured image obtained by photographing the measuring apparatus; and
   a manager terminal that monitors the measured value of the measuring apparatus which is reported from the sensor terminal,
   wherein when the measured value of the measuring apparatus is out of a normal range, the manager terminal requests transmission of image data of an image area which is necessary and sufficient to check whether the measured value of the measuring apparatus is actually out of the normal range or not in the captured image from the sensor terminal by designating a range and resolution of the image area;
   wherein the sensor terminal transmits the requested image data of the image area in the captured image with the requested resolution to the manger terminal in response to the request from the manager terminal, and
   wherein a plurality of transfer patterns that are transfer formats of the image data including an image size and resolution of the image area regarding which transfer of the image data to the sensor terminal is requested are set in advance;
   wherein a priority is set to each of the transfer patterns; and
   wherein the manager terminal:
      regularly or irregularly acquires remaining time of the battery for the sensor terminal and a communication speed of a communication path to the sensor terminal; and
      requests, on the basis of the remaining time of the battery and the communication speed which have been acquired, and the image size of the image area which is defined by each of the transfer patterns, that the sensor terminal should transmit the image data of the image area with the image size and the resolution that are defined by the transfer pattern with the priority which is the highest among the transfer patterns capable of transferring the image data of the image area within the remaining time of the battery.

2. The monitoring system according to claim 1,
   wherein the image area which is necessary and sufficient to check whether the measured value of the measuring apparatus is actually out of the normal range or not in the captured image is:

an image area in which a part or whole of a pointer of the measuring apparatus appears when the measured value of the measuring apparatus is within the normal range; or an image area where a part or whole of the pointer of the measuring apparatus at present appears.

3. The monitoring system according to claim 1, wherein the manager terminal determines a threshold value for the normal range of the measured value on the basis of the measured values in the past which are reported from the sensor terminal.

4. The monitoring system according to claim 2, wherein the manager terminal determines a threshold value for the normal range of the measured value on the basis of the measured value which is more recent from among the measured values in the past which are reported from the sensor terminal.

5. The monitoring system according to claim 2, wherein the manager terminal determines a threshold value for the normal range of the measured value on the basis of the measured values in the past acquired at the same time of day or almost the same time of day from among the measured values in the past which are reported from the sensor terminal.

6. A method for controlling a monitoring system for monitoring a status of a monitoring object apparatus, the monitoring system including:
a sensor terminal that is driven by a battery and acquires a measured value or measured values of a measuring apparatus mounted in the monitoring object apparatus by executing image analysis processing on a captured image obtained by photographing the measuring apparatus; and
a manager terminal that monitors the measured value of the measuring apparatus which is reported from the sensor terminal,
the monitoring system control method comprising:
a first step executed, when the measured value of the measuring apparatus is out of a normal range, by the manager terminal requesting transmission of image data of an image area which is necessary and sufficient to check whether the measured value of the measuring apparatus is actually out of the normal range or not in the captured image from the sensor terminal by designating a range and resolution of the image area; and
a second step executed by the sensor terminal transmitting the requested image data of the image area in the captured image with the requested resolution to the manger terminal in response to the request from the manager terminal,
wherein a plurality of transfer patterns that are transfer formats of the image data including an image size and resolution of the image area regarding which transfer of the image data to the sensor terminal is requested are set in advance;
wherein a priority is set to each of the transfer patterns; and
wherein the manager terminal regularly or irregularly acquires remaining time of the battery for the sensor terminal and a communication speed of a communication path to the sensor terminal; and
wherein in the first step, the manager terminal requests, on the basis of the remaining time of the battery and the communication speed which have been acquired, and the image size of the image area which is defined by each of the transfer patterns, that the sensor terminal should transmit the image data of the image area with the image size and the resolution that are defined by the transfer pattern with the priority which is the highest among the transfer patterns capable of transferring the image data of the image area within the remaining time of the battery.

7. The monitoring system control method according to claim 6, wherein in the first step, the manager terminal designates, as the image area which is necessary and sufficient to check whether the measured value of the measuring apparatus is actually out of the normal range or not in the captured image, an image area in which a part or whole of a pointer of the measuring apparatus appears when the measured value of the measuring apparatus is within the normal range, or an image area where a part or whole of the pointer of the measuring apparatus at present appears.

8. The monitoring system control method according to claim 6, wherein the manager terminal determines a threshold value for the normal range of the measured value on the basis of the measured values in the past which are reported from the sensor terminal.

9. The monitoring system control method according to claim 8, wherein the manager terminal determines a threshold value for the normal range of the measured value on the basis of the measured value which is more recent from among the measured values in the past which are reported from the sensor terminal.

10. The monitoring system control method according to claim 8, wherein the manager terminal determines a threshold value for the normal range of the measured value on the basis of the measured values in the past acquired at the same time of day or almost the same time of day from among the measured values in the past which are reported from the sensor terminal.

* * * * *